United States Patent [19]

Koehler et al.

[11] 4,356,901

[45] Nov. 2, 1982

[54] SUPPORT FOR A SERIES OF FRICTION DISCS

[75] Inventors: Daniel L. Koehler, Troy, Mich.; Walter O. Zajac, Oshkosh, Wis.

[73] Assignee: Rockwell International Corporation, Pittsburgh, Pa.

[21] Appl. No.: 187,386

[22] Filed: Sep. 15, 1980

[51] Int. Cl.³ .............................................. F16D 13/52
[52] U.S. Cl. .................................. 192/70.2; 188/71.5; 188/73.2; 188/218 XL
[58] Field of Search ................... 188/71.1, 71.5, 73.2, 188/218 XL; 192/70.19, 70.2, 70.4, 112, 115

[56] References Cited

U.S. PATENT DOCUMENTS

| 1,001,835 | 8/1911 | Franquist | 192/70.2 |
| 1,172,502 | 2/1916 | Tone | 192/70.19 |
| 2,025,098 | 12/1935 | Dudick | 188/71.5 |
| 2,738,864 | 3/1956 | Becker | 192/70.14 |
| 3,707,207 | 12/1972 | Kondo | 188/71.5 |
| 3,825,100 | 7/1974 | Freeman | 188/218 XL X |
| 3,941,221 | 3/1976 | Pringle | 185/218 XL |
| 4,058,027 | 11/1977 | Webb | 192/107 C X |

Primary Examiner—George E. A. Halvosa

[57] ABSTRACT

An improved support is for a series of friction discs within a housing of a clutch, brake or the like of the type which includes a central member mounted for rotation relative to the housing. A series of reaction discs are alternatively disposed between the friction discs and are mounted for relative rotation with the central member. Each friction disc includes a plurality of generally axially extending tabs which are received within a plurality of slots in the adjacent friction disc to prevent relative rotation between the friction discs. A slot in a portion of the housing adjacent the last friction disc in the series receives the tabs thereof to prevent relative rotation of the entire series with respect to the housing. Axial force being applied to the series of friction discs and reaction discs produces frictional forces therebetween tending to reduce relative rotation of the housing and central member.

8 Claims, 3 Drawing Figures

SUPPORT FOR A SERIES OF FRICTION DISCS

BACKGROUND OF THE INVENTION

1. Field of the Invention

This invention relates to an improved support for a series of friction discs within a housing of a clutch, brake or the like and, more specifically, to such a support which includes means for coupling the friction discs one to the other and to a portion of the housing to prevent any relative rotation therebetween.

2. Description of the Prior Art

There are a number of clutches, brakes or the like which utilize friction engaging means in the form of multiple friction and reaction discs. Such a clutch can be found in U.S. Pat. No. 2,738,864 while typical such brakes can be seen in U.S. Pat. Nos. 3,584,708; 4,000,791; 4,146,116; and 4,173,269. Each of these clutch and brake configurations utilizes series of friction discs and reaction discs which are alternatively stacked so that the series are respectively associated with a pair of relatively rotating members of the clutch or brake.

Typically, one of the members is a housing and the other member is centrally mounted for rotation relative to the housing. The series of reaction discs is keyed or splined to the central member for relative rotation therewith. The series of friction discs which are interdispersed between the reaction discs are mounted within the housing in a manner which prevents any relative rotation therebetween.

As seen in the above-mentioned patents there exists a number of means for mounting the friction discs which prevent the relative rotation between the discs and the housing while still allowing some limited axial movement relative to the housing. One means includes providing extending tabs at the outer periphery of the discs which are received within axially extended slots within the housing. Another means includes providing axially extending ribs, splines or bolts within the interior of the housing as slots provided in the outer periphery of the discs are aligned to slidably receive the ribs, splines or bolts therein.

While these methods of preventing relative rotation between the series of discs and the housing have proven to be satisfactory in the past, there remains a need for providing an alternative means for preventing relative rotation between the discs and the housing which might simplify the design of the housing. Additionally, an alternative means for preventing the relative rotation mentioned hereinabove might contribute to the solution of other problems in clutch or brake designs such as problems relating to the proper introduction and supply of lubricating oil to the discs for cooling and lubrication purposes.

SUMMARY OF THE INVENTION

It is therefore an object of this invention to provide an improved support for a series of friction discs within the housing of a clutch, brake or the like.

It is also an object to provide such a support which includes a unique means for coupling the friction discs one to the other and to the housing to prevent relative rotation therebetween.

These and other objects of the invention are provided in a preferred embodiment thereof which includes an improved support for a series of friction discs within a housing of a clutch, brake or the like of the type which includes a central member mounted for rotation relative to the housing. The central member has a series of reaction discs mounted for rotation therewith and the reaction discs are alternatively disposed between the friction discs. There is included means for applying an axial force to the series of friction discs and the series of reaction discs to produce frictional forces therebetween tending to reduce relative rotation between the housing and the central member. The improved support includes means for coupling each of the friction discs to an adjacent friction disc to prevent relative rotation therebetween. There is also provided means for coupling the friction discs of the series located at at least one end thereof to a portion of the housing to prevent relative rotation between the friction discs and the housing.

DETAILED DESCRIPTION OF THE PREFERRED EMBODIMENT

Figure 1:
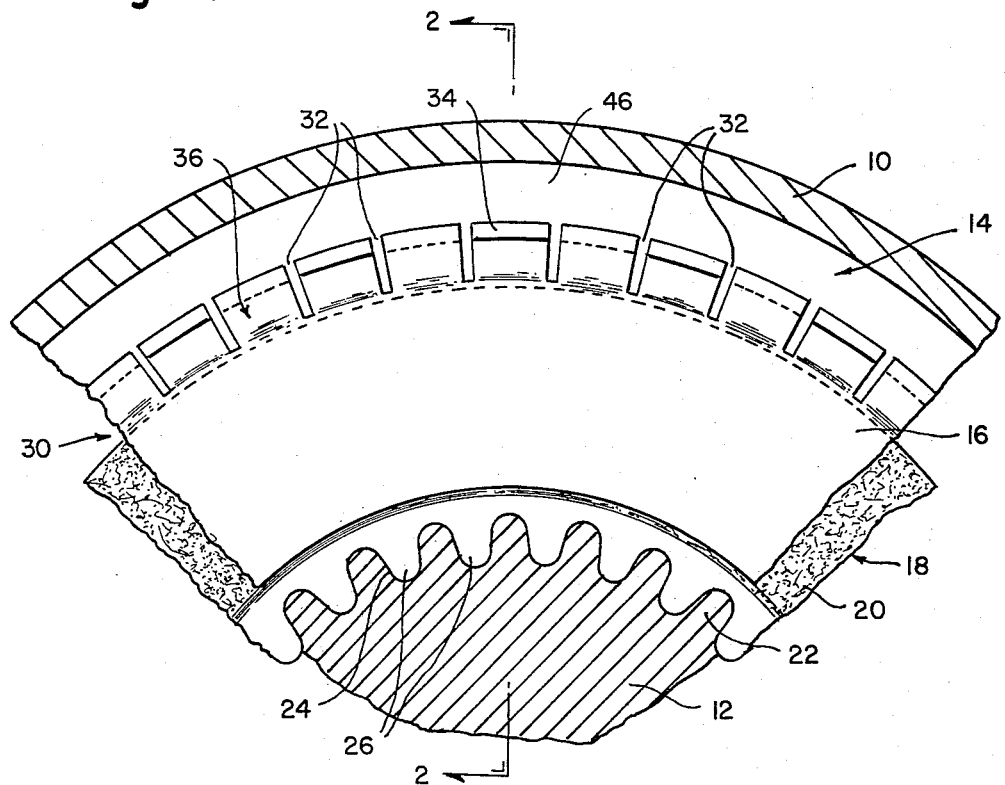
FIG. 1 is a fragmentary elevational view of the preferred support including various features of the invention.
Figure 2:
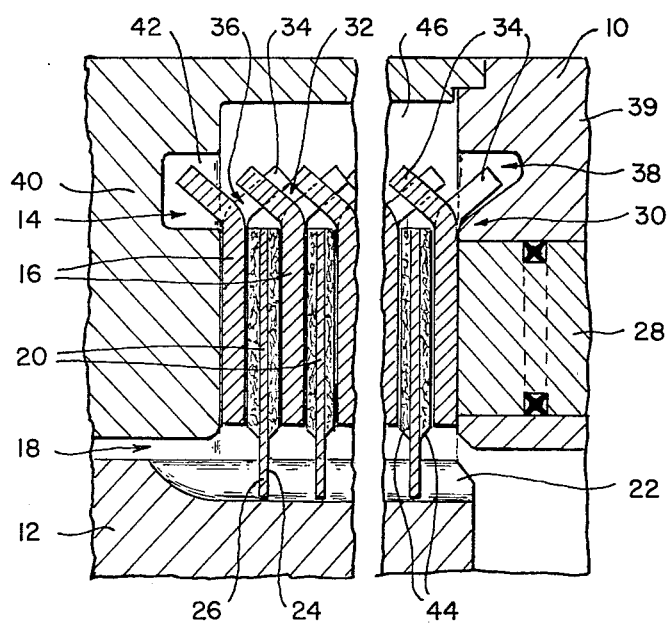
FIG. 2 is a sectional view of the embodiment shown in FIG. 1 as seen along Line 2—2.
Figure 3:
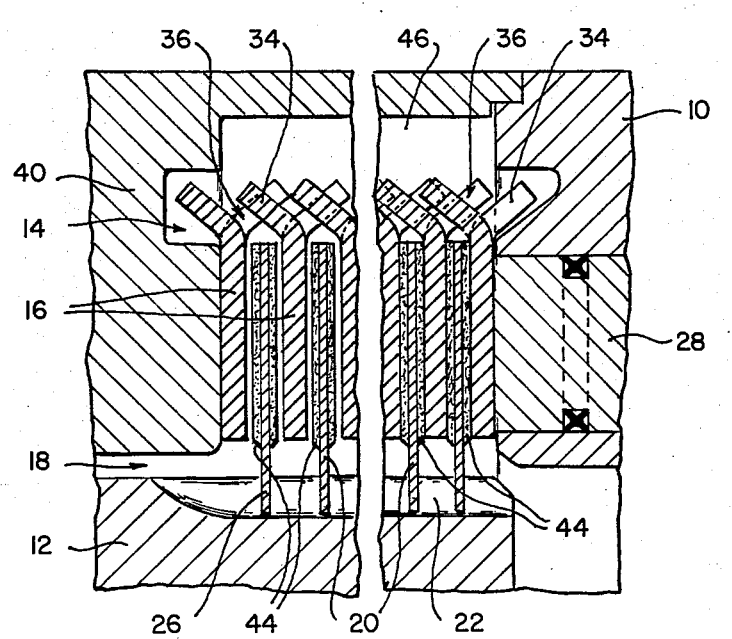
FIG. 3 is a view of the embodiment as shown in FIG. 2 including additional features of the invention.

As seen in FIGS. 1, 2 and 3, the improved support for a series of friction discs can be utilized in any number of clutch or brake configurations. The clutch or brake is of the type which includes a housing 10 and a central member 12 which is mounted for rotation relative to the housing 10. In the preferred embodiment a brake configuration has been chosen for the purposes of demonstrating the invention and the housing 10 of the brake is rigidly supported as a rotating member 12 in the form of a shaft is mounted for rotation within the interior of the housing. It should be clear to one skilled in the art that the support for a series of friction discs as disclosed in the preferred embodiment could similarly be employed in a clutch configuration while still falling within the scope of the invention.

Basically, the preferred brake includes a series 14 of friction discs 16 which are intended to be mounted relative to the housing 10 in a manner that will prevent any relative rotation therebetween. A series 18 of reaction discs 20 are mounted relative to the shaft 12 for rotation therewith. Specifically, in the preferred embodiment, the shaft 12 includes a splined region 22 which is adapted to receive thereon the reaction discs 20 which each include an opening 24 therein which has internal teeth means 26 adapted to be received over the splined region 22 of the shaft 12. Consequently, rotation of the shaft 12 will cause each of the reaction discs 20 to rotate therewith while still allowing some limited axial relative movement on the shaft 12.

As is typical of such brakes and clutches, the reaction discs 20 of the series 18 are each mounted between adjacent friction discs 16 of the series 14. During normal operation of the brake or clutch, the relative rotation existing between the shaft 12 and the housing 10 will continue until the application of compressive forces on the alternating friction discs 16 and reaction discs 20 reduces the relative rotation between the housing 10 and the shaft 12. In the preferred brake configuration an annular piston means 28 is mounted within the housing 10 in alignment with the discs 16, 20 to produce a force thereon which can be selectively actuated to produce sufficient frictional forces between the discs 16, 20 to reduce the relative rotation of the shaft 12 in the housing 10.

As thus described, the preferred brake utilizes the selective creation of frictional forces between the relatively rotating discs in the manner which is well known in the prior art. However, as mentioned hereinabove, a number of such brakes and clutches utilize specifically designed grooves, channels, splines or bolts in the housing to allow axial movement of the series of friction discs while preventing any rotation relative to the housing. In these the systems each of the friction discs is directly coupled to the housing to prevent the relative rotation.

The preferred friction discs 16, however, are designed to include means at their outer peripheries 30 to effectively couple each of the friction discs 16 one to the other to prevent any relative rotation therebetween. This is accomplished by providing an even numbered plurality of slits 32 at the outer periphery 30 of each disc 16. Each pair of slits 32 defines therebetween a portion of the base material of the friction disc 16 which can then be bent in a generally axial direction to provide a tab 34 which overlies the outer periphery of the adjacent friction disc 16. By bending alternative tabs 34 in opposite directions around the entire periphery 30 of each friction disc 16, an entire array of alternating tabs will provide a form of coupling to the adjacent friction disc 16 on one side of each friction disc 16 while another array of tabs 34 extending generally axially in the opposite direction will similarly provide coupling for the adjacent friction disc 16 on the other side of the intermediate friction disc 16. The formation of the tabs 34 at the outer periphery 30 of each friction disc 16 in this manner produces a pluraliy of slots 36 at the outer periphery of each friction disc 16 which is similarly defined by the adjacent slits 32 by the absence of base material of the friction disc 16 resulting from the bending of tab 34. As a result, each tab 34 of a friction disc 16 will be received within a slot 36 formed between adjacent tabs 34 of an adjacent friction disc 16. The formation of the tabs 34 and slots 36 in this manner results in the friction discs 16 being identical and provides many areas of overlapping contact which will prevent relative rotation therebetween. Each tab 34 is designed to have sufficient length to allow some limited axial displacement of adjacent friction disc 16 while still maintaining the desired contact needed to prevent relative rotation.

While the preferred embodiment includes a large number of such tabs 34 and slots 36 as explained hereinabove, it can be seen that it would be possible to provide a reduced number of tabs at the outer periphery of a friction disc that was capable of being received within a different form of slot at the outer periphery of the adjacent friction disc. For example, the tab might be formed by an extension at the outer periphery of the friction disc and might then be bent back toward the adjacent friction disc which has been provided a notch at the outer periphery thereof which would serve as a slot for receipt of the tab.

However, providing a means in the present invention for coupling the friction discs 16 one to the other only partially establishes one of the essential criterias for the proper working of this type of brake or clutch. To prevent the rotation of the series 14 of friction discs 16, a groove 38 is formed in the interior wall of an end portion 39 of the housing 10 for receipt therein of each tab 34 of the friction disc 16 at the end of the series 14. The groove 38 in the interior of the housing 10 thus will prevent the last friction disc 16 in the series 14 from rotating and it will in turn through the series of tabs 34 and slots 36 cause all of the remaining friction discs 16 to be maintained against rotation relative to the housing 10.

In the preferred embodiment, a means is provided at the other end of the housing 10 for providing additional assurances against rotation of the series 14 of friction discs 16 relative the housing 10. Since the friction discs 16 of the preferred embodiment are identical one to the other, the groove at the other end 40 of the housing might be identical to the groove 38 mentioned hereinabove. However, it can be said that rather than providing a series of grooves at the end 40 of the housing 10, a series of extensions 42 can be included which are aligned to be received within the plurality of slots 36 of the friction discs 16 at the adjacent end of the series 14. Admittedly, there is little distinction between the arrangement provided in the preferred embodiment at each end of the series 14 of the preferred friction discs 16 preventing the rotation relative to the housing 10. However, since the friction discs might be provided an alternative configuration (for example, one in which the slot 36 would not be defined by adjacent bent tabs 34), the extension 42 could be designed to axially extend into a slot at the periphery of an alternative friction disc at the end of the series to further insure against rotation.

As seen in FIG. 3 the preferred support for the friction discs 16 includes features which will satisfy some of the operational requirements for a multi-disc clutch or brakes of this type. For example, the preferred embodiment shows reaction discs 20 of the series 18 with friction pads 44 at each side thereof which are made of a material which will wear during the effective life of the brake or clutch. The view shown in FIG. 3 includes the reaction discs 20 in which the pads 44 are sufficiently worn so that the initial axial displacement of the discs 16, 20 one from the other are no longer maintained because of the reduced thickness of the reaction discs 20. As seen at the right-hand side of FIG. 3 the friction discs 16 are more closely spaced since the reaction discs 20 therebetween have a reduced thickness. The tab 34 and slot 36 configuration discussed hereinabove still enables the adjacent friction discs 16 to be maintained in proper contact for the prevention of relative rotation therebetween.

However, since the friction discs at the right are more closely spaced, it would be possible for other friction discs (those shown at the left of the housing 10) to be further separated since the overall axial thickness of the multi-disc configuration has been reduced while the internal dimensions of the housing 10 have remained the same. Again, the tab 34 and slot 36 configuration of the present invention will accommodate such spacing which might be greater than the spacing between adjacent friction discs 16 during initial installation. Although it is recognized that in some brake configurations there is included slack adjuster means to prevent the type of spacing between adjacent friction discs 16 as represented in the left of FIG. 3, the support for the friction discs of the present invention will still accommodate such spacing if needed for proper brake or clutch operation.

From the description provided hereinabove, it should be clear that the support for the friction discs within a housing can be provided an alternative configuration which will still be capable of coupling the friction discs to prevent relative rotation therebetween and for insuring that the friction discs will not rotate relative to the housing. In any case, the present invention now discloses a support for the friction disc which requires no special design or configuration for the region 46 of the housing 10 which immediately surrounds the series 14 of friction discs 16. As a result, some structural elements might be eliminated which would otherwise add to the overall cost of manufacturing the brake or clutch. In some brake and clutch configurations oil for lubrication and cooling is supplied to the interior of the housing for flow through and between the discs 16, 20 which is needed for the proper operation of the brake or clutch. Grooves, ribs, bolts or splines formed in the housing in the region 46 surrounding the friction disc 16 have in some cases interferred with the designed flow of lubricating oil to the discs 16, 20. Accordingly, the improved support for the friction discs within the housing of this invention not only allows an alternative means for preventing relative rotation of the friction discs relative to the housing but removes a structural feature which existed in the design of housings for brakes and clutches in the prior art which might have interferred in the design of a proper lubricating and cooling system for the clutch or brake.

We claim:

1. An improved support for a series of three or more friction discs within a housing of a clutch, brake, or the like of the type which includes a central member mounted for rotation relative to said housing, said central member having a series of reaction discs mounted for rotation therewith, said reaction discs being alternatively disposed between said friction discs, and means for applying an axial force to said series of said friction discs and said series of said reaction discs to product frictional forces therebetween tending to reduce relative rotation between said housing and said central member, said improved support comprising:
   each of said friction discs being identical and including means thereon for coupling said each said friction discs directly to an adjacent said friction disc to positively prevent relative rotation therebetween; and
   means for coupling said friction disc of said series located at at least one end thereof to a portion of said housing to positively prevent relative rotation therebetween.

2. The improved support as set forth in claim 1, further including means for coupling said friction disc of said series located at the other end thereof to another portion of said housing as additional means to prevent relative rotation between said housing and said series of said friction discs.

3. The improved support as set forth in claim 1, wherein said means for coupling said each friction disc of said series to said adjacent friction disc of said series includes a tab means located at the outer periphery of said each friction disc extending generally axially to be received within slot means located at the outer periphery of said adjacent friction disc, said tab means and said slot means remaining engaged while allowing limited relative axial movement between said each friction disc and said adjacent friction disc.

4. The improved support as set forth in claim 3, wherein said tab means includes a plurality of tabs at said outer periphery of said each friction disc which are defined by radially extending slits at each side thereof as said tab is bent generally axially toward said adjacent friction disc.

5. The improved support as set forth in claim 4, wherein said means for coupling said friction disc of said series located at at least one end thereof to a portion of said housing includes groove means in said portion of said housing which is capable of receiving at least one of said plurality of said tabs therein.

6. The improved support as set forth in claim 4, wherein said slot means at said outer periphery of said adjacent friction disc includes a plurality of slots defined by said radially extending slits as each said tab therebetween extends toward a next said adjacent friction disc.

7. The improved support as set forth in claim 6, further including means for coupling said friction disc of said series located at the other end thereof to another portion of said housing as additional means to prevent relative rotation between said housing and said series of said friction disc including extended means on said another portion of said housing which is received within at least one of said plurality of said slots.

8. The improved support as set forth in claim 6, wherein said radially extending slits are included in an even numbered plurality of evenly spaced slits extending around the entire outer periphery of said friction discs of said series, said tabs extend alternatively in opposite generally axial directions and said each tab of said each friction disc is received within said slot of said adjacent friction disc defined by said slits and between adjacent said tabs thereof which extend back toward said each friction disc.

* * * * *